(12) United States Patent
Jiang et al.

(10) Patent No.: US 7,045,108 B2
(45) Date of Patent: May 16, 2006

(54) METHOD FOR FABRICATING CARBON NANOTUBE YARN

(75) Inventors: KaiLi Jiang, Beijing (CN); Shoushan Fan, Beijing (CN); QunQing Li, Beijing (CN)

(73) Assignees: Tsinghua University, Beijing (CN); Hon Hai Precision Ind. Co., Ltd., Taipei Hsien (TW)

( * ) Notice: Subject to any disclaimer, the term of this patent is extended or adjusted under 35 U.S.C. 154(b) by 662 days.

(21) Appl. No.: 10/335,283

(22) Filed: Dec. 31, 2002

(65) Prior Publication Data

US 2004/0053780 A1 Mar. 18, 2004

(30) Foreign Application Priority Data

Sep. 16, 2002 (CN) .................................. 02134760

(51) Int. Cl.
*D01F 9/12* (2006.01)
(52) U.S. Cl. .............................. 423/447.2; 423/447.1; 423/447.3; 428/367; 977/DIG. 1
(58) Field of Classification Search ............. 423/447.1, 423/447.2, 447.3; 428/367; 977/DIG. 1
See application file for complete search history.

(56) References Cited

U.S. PATENT DOCUMENTS

| 6,682,677 | B1 * | 1/2004 | Lobovsky et al. | 264/172.11 |
| 6,749,827 | B1 * | 6/2004 | Smalley et al. | 423/447.3 |
| 6,957,993 | B1 * | 10/2005 | Jiang et al. | 445/50 |
| 2003/0161950 | A1 * | 8/2003 | Ajayan et al. | 427/249.1 |
| 2004/0047038 | A1 * | 3/2004 | Jiang et al. | 359/486 |

OTHER PUBLICATIONS

Vigolo et al. "Macroscopic Fibers and Ribbons of Oriented Carbon Nanotubes" Nov. 17, 2000, Science, vol. 290, pp. 1331-1334.*
Cheng et al. "Bulk morphology and diameter distribution of single-walled carbon nanotubes synthesized by catalytic decomposition of hydrocarbons" Jun. 19, 1998, Chemical Physics Letters, vol. 289, pp. 602-610.*
Zhu et al. "Direct Synthesis of Long Single-Walled Carbon Nanotube Strands" May 3, 2002, Science, vol. 296, pp. 884-886.*
Jiang et al. "Spinning continuous carbon nanotube yarns" Oct. 24, 2002, Nature, vol. 419, p. 801.*

* cited by examiner

*Primary Examiner*—Stanley S. Silverman
*Assistant Examiner*—Peter J Lish
(74) *Attorney, Agent, or Firm*—Wei Te Chung

(57) ABSTRACT

A method of fabricating a long carbon nanotube yarn includes the following steps: (1) providing a flat and smooth substrate; (2) depositing a catalyst on the substrate; (3) positioning the substrate with the catalyst in a furnace; (4) heating the furnace to a predetermined temperature; (5) supplying a mixture of carbon containing gas and protecting gas into the furnace; (6) controlling a difference between the local temperature of the catalyst and the furnace temperature to be at least 50° C.; (7) controlling the partial pressure of the carbon containing gas to be less than 0.2; (8) growing a number of carbon nanotubes on the substrate such that a carbon nanotube array is formed on the substrate; and (9) drawing out a bundle of carbon nanotubes from the carbon nanotube array such that a carbon nanotube yarn is formed.

15 Claims, 1 Drawing Sheet

METHOD FOR FABRICATING CARBON NANOTUBE YARN

BACKGROUND OF THE INVENTION

1. Field of the Invention

The present invention relates to a method for fabricating a nanotube structure, and more particularly to a method for fabricating a carbon nanotube yarn.

2. Description of Prior Art

Since being discovered in 1991, carbon nanotubes have been synthesized by numerous methods such as laser vaporization, arc discharge, pyrolysis and plasma-enhanced or thermal chemical vapor deposition. However, all carbon nanotubes which have been produced by these methods are short in length, the longest carbon nanotubes being only several-hundred micrometers in length. These short lengths restrict the applications of carbon nanotubes. In particular, such short lengths are not suitable for use in macroscopic objects, such as bullet proof vests and fabrics that block electromagnetic waves.

Therefore, a method for fabricating long carbon nanotube structures or yarns is desired.

SUMMARY OF THE INVENTION

Accordingly, an object of the present invention is to provide a method for fabricating long carbon nanotube structures, and specifically for fabricating a carbon nanotube yarn.

In order to achieve the object set forth above, the present invention provides a method for fabricating a carbon nanotube yarn. The method comprises the following steps:

(1) forming a carbon nanotube array where carbon nanotubes are bundled up together; and
(2) drawing out a bundle of carbon nanotubes from said carbon nanotube array such that a carbon nanotube yarn is formed.

The step of forming the carbon nanotube array further comprises:

(1) depositing a catalyst on a substantially flat and smooth substrate;
(2) positioning the substrate with the catalyst in a furnace;
(3) heating the furnace up to a predetermined temperature;
(4) supplying a mixture of carbon containing gas and protecting gas into the furnace;
(5) controlling a difference between the local temperature of the catalyst and the furnace temperature to be at least 50° C.;
(6) controlling the partial pressure of the carbon containing gas to be less than 0.2; and
(7) growing a plurality of carbon nanotubes on the substrate such that the carbon nanotube array is formed on the substrate.

Other objects, advantages and novel features of the present invention will become more apparent from the following detailed description when taken in conjunction with the accompanying drawings, in which:

DETAILED DESCRIPTION OF PREFERRED EMBODIMENT OF THE INVENTION

Figure 1:
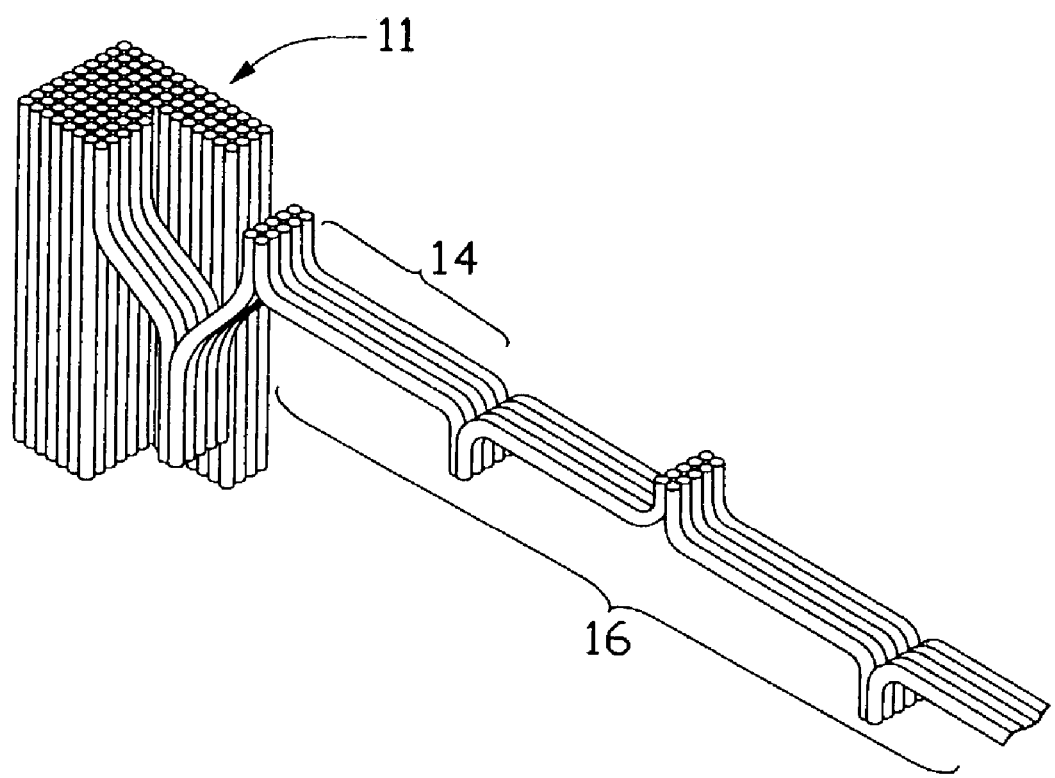
FIG. 1 is a schematic view of a carbon nanotube yarn being drawn from a carbon nanotube array in accordance with the present invention.

A method for creating a carbon nanotube yarn comprises:

Step 1. Forming an array 11 of carbon nanotubes, discussed in greater detail below.

Firstly, a substrate is provided. The substrate includes a silicon wafer, which is two inches in diameter and 350 μm thick. An 800 nm thick thermal-oxidized layer is formed on the silicon wafer. A surface of the thermal-oxidized layer is flat and smooth, to enable growth of a large-scale array of carbon nanotubes. Then an iron thin film that is 5 nm thick is deposited on the substrate by electron beam evaporation, and is subsequently annealed in air at 300~400° C. for 10 hours to form a ferrous oxide film. Then the ferrous oxide film is reduced to pure iron by reaction with hydrogen or ammonia, so that the pure iron can be used as a catalyst.

The substrate is then preferably diced into a plurality of rectangular pieces. Each such piece is put into a quartz boat, which is subsequently inserted into the center of a one-inch quartz tube furnace. The tube furnace is then heated to 650~700° C. in flowing argon gas. After that, a mixture of 30 sccm (standard cubic centimeter per minute) acetylene and 300 sccm argon gas is supplied into the tube furnace for 5~30 minutes. Acetylene functions as a carbon containing gas, and argon functions as a protecting gas. The furnace is then cooled down to room temperature. Thus, a superaligned array 11 of carbon nanotubes is formed on the substrate, with carbon nanotubes being compactly bundled up together.

Step 2. Referring to FIG. 1, pulling out carbon nanotube yarn 16 from the superaligned array 11 of carbon nanotubes.

A carbon nanotube bundle 14 of the carbon nanotube array 11 is pulled out by a tool, for example tweezers. A carbon nanotube bundle 14 is any plurality of carbon nanotubes formed in a contiguously adjacent group in the carbon nanotube array 11. As a carbon nanotube bundle 14 is drawn out, it can often pull out successive other carbon nanotube bundles 14 joined end to end in a sort of chain connected by van der Waals attractive force between ends of adjacent bundles. As a result, the yarn 16 is formed.

Not all carbon nanotube arrays can be used to create yarns. Yarns can only be drawn out from superaligned carbon nanotube arrays. Based on extensive experimentation on the growth mechanisms of carbon nanotubes, the crucial factors for growing a superaligned carbon nanotube array 11 suitable for production of the yarns 16 are listed below:

a. The substrate should be substantially flat and smooth.
b. The growth rate should be relatively high.
c. The partial pressure of the carbon containing gas should be relatively low.

When the substrate is flat and smooth, a higher density carbon nanotube array 11 can be formed. Because the carbon nanotubes are packed closely together, the van der Waals attractive force between adjacent carbon nanotubes is strong, which enables the carbon nanotubes to be pulled out in linked bundles from the carbon nanotube array 11 to form the yarn 16. Therefore, a non-porous silicon wafer or a silicon wafer with a thermal-oxidized film can be used as the substrate.

If factors b and c above are fulfilled, the carbon nanotubes will be well graphitized, and will have no deposits on their outer surfaces. As is known in the art, during the growth of carbon nanotubes, amorphous carbons are simultaneously deposited on outer surfaces of the carbon nanotubes. This gives rise to considerably less van der Waals attractive force between the carbon nanotubes. The growth rate of the carbon nanotubes needs to be high, while the deposition rate of amorphous carbons needs to be low. The growth rate of carbon nanotubes is proportional to a difference between the furnace temperature and the local temperature of the catalyst. Generally, the difference in the temperatures is controlled to be at least 50° C., in order to enhance the growth rate of the carbon nanotubes. The deposition rate of amorphous carbons is proportional to the partial pressure of carbon containing gas. In practice, the local temperature of the catalyst can be controlled by adjusting the flow rate of carbon containing gas, and the furnace temperature can be directly controlled. The partial pressure of carbon containing gas can be controlled by adjusting the ratio of the flow rates of the carbon containing gas and the protecting gas. Typically, the partial pressure of the carbon containing gas is not more than 0.2, and preferably not more than 0.1.

A combined width of the yarn 16 depends on a number of carbon nanotube threads in the yarn 16. In general, the combined width of the yarn 16 can be controlled by a size of the tips of the tool that is used to pull out the yarn 16. The smaller the tips, the thinner the combined width of the yarn 16. A force required to pull out the yarn 16 together depends on the combined width of the yarn 16. For example, a force of 0.1 mN is needed to pull out a 200 μm wide yarn from the carbon nanotube array 11. Generally, the greater the combined width of the yarn 16, the greater the force required. A combined length of the yarn 16 depends on an area of the carbon nanotube array 11. Experimental data indicates that it may be possible to draw out a 10 m long 200 μm wide yarn 16 from a 100 μm high carbon nanotube array 11 having an area of 1 cm$^2$.

It will be apparent to those having ordinary skill in the field of the present invention that the acetylene gas may be substituted with methane, ethane or other similar hydrocarbon gases, and the argon gas may be substituted with nitrogen, helium or the other protecting gases.

It will be also apparent to those having ordinary skill in the field of the present invention that the catalyst iron can be substituted with cobalt, nickel, molybdenum, ruthenium, manganese, or mixtures or alloys of the same.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A method of fabricating a carbon nanotube yarn comprising:
   (1) forming a carbon nanotube array; and
   (2) drawing out a bundle of carbon nanotubes from said carbon nanotube array such that a carbon nanotube yarn is formed.

2. The method in accordance with claim 1, wherein the step of forming a carbon nanotube array comprises:
   (1) depositing a catalyst on a substantially flat and smooth substrate;
   (2) positioning the substrate with the catalyst in a furnace;
   (3) heating the furnace up to a predetermined temperature;
   (4) supplying a mixture of carbon containing gas and protecting gas into the furnace;
   (5) controlling a difference between the local temperature of the catalyst and the furnace temperature to be at least 50° C.;
   (6) controlling the partial pressure of the carbon containing gas to be less than 0.2; and
   (7) growing a plurality of carbon nanotubes on the substrate such that the carbon nanotube array is formed on the substrate.

3. The method in accordance with claim 2, wherein the catalyst comprises transition metals selected from the group consisting of iron, cobalt, nickel, molybdenum, ruthenium, manganese, or mixtures or alloys of the same.

4. The method in accordance with claim 3, wherein the catalyst is deposited on the substrate and formed into a film having a 5 nm thickness.

5. The method in accordance with claim 4, wherein the flat and smooth substrate with the catalyst is annealed in air at 300~400° C. for 10 hours before the substrate with the catalyst is put into the furnace and the furnace is heated to predetermined temperature.

6. The method in accordance with claim 2, wherein in step (3) the predetermined temperature of the furnace is 650~700° C.

7. The method in accordance with claim 2, wherein before step (4) a protecting gas is supplied into the furnace.

8. The method in accordance with claim 2, wherein in step (4) the carbon containing gas and the protecting gas comprise acetylene and argon, respectively.

9. The method in accordance with claim 8, wherein the flow rate of the acetylene and argon gases are 30 sccm and 300 sccm, respectively.

10. The method in accordance with claim 2, wherein in step (6) the partial pressure of the carbon containing gas is preferably less than 0.1.

11. The method in accordance with claim 2, wherein after step (7) the furnace is cooled down to room temperature.

12. A carbon nanotube yarn comprising a plurality of carbon nanotube bundles which are joined end to end by van der Waals attractive force, wherein each of the carbon nanotube bundles comprises a plurality of carbon nanotubes substantially parallel to each other.

13. The carbon nanotube yarn in accordance with claim 12, wherein the adjacent two nanotube bundles are joined with each other at respective ends in a sideward direction instead of longitudinal direction along an axial direction of the nanotube of each of said nanutube bundles.

14. The carbon nanotube yarn in according with claim 12, wherein said carbon nanotube yarn is extendable along a drawing direction.

15. The carbon nanotube yarn in according with claim 14, said drawing direction is parallel to said sideward direction.

* * * * *